June 7, 1932.     J. KLEFFMAN     1,861,478
BOX TRAP
Filed Nov. 17, 1930
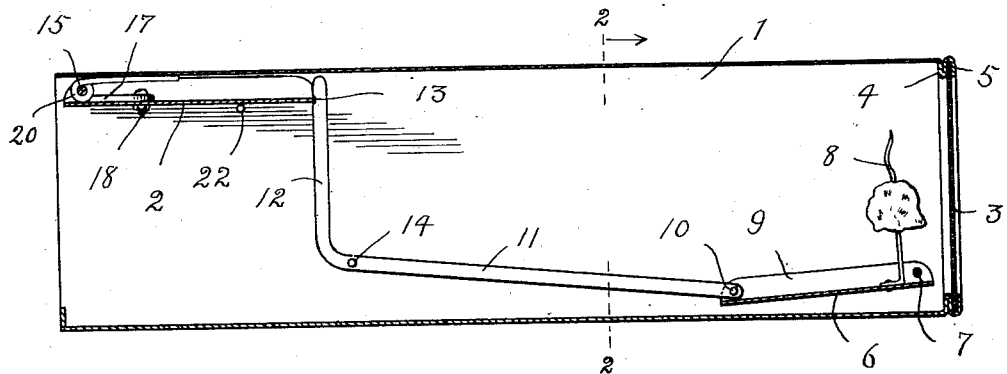
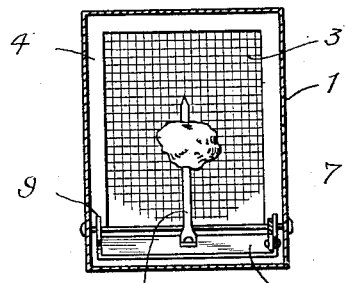
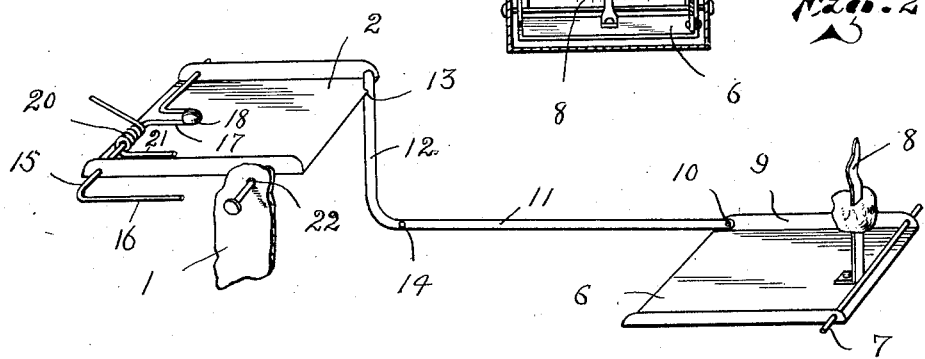
Inventor
John Kleffman
By Geo Sevrns
Attorney Patented June 7, 1932

1,861,478

UNITED STATES PATENT OFFICE

JOHN KLEFFMAN, OF HIBBING, MINNESOTA

BOX TRAP

Application filed November 17, 1930. Serial No. 496,139.

This invention relates to animal traps.

The principal object of the invention is to provide an improved trap of this type, and other minor objects and advantages of the invention will appear in the following description thereof.

Referring now to the accompanying drawing wherein like reference characters indicate like parts:

Figure 1 is a vertical central section of a trap embodying the invention;

Figure 2 is a transverse section on the line 2—2, Figure 1; and

Figure 3 is a perspective view of the operating mechanism of the trap apart from the closure.

The trap is of the type known as a box trap, and is especially designed for catching animals alive, and is particularly adapted for trapping small animals, such as mink, weasels, rats, and the like.

In the drawing, 1 represents the body portion of the trap which is preferably constructed of sheet metal, and formed with one open end controlled by the door 2, and a closed end covered by the wire screen 3. As a seat for the wire screen I prefer to crimp inwardly the side walls of the body portion as at 4, and then clinch the same about the edges of the screen as at 5, which is found to make a very simple and efficient union of the screen.

The trigger platform indicated at 6 is pivoted as at 7 just inwardly of the screened end 3 and is provided centrally of and adjacent its pivoted end with the upstanding sprig 8 upon which the bait may be empaled or otherwise fastened. This trigger platform is turned up upon its opposite sides forming flange like portions 9, one of which pivotally carries as at 10 the end 11 of the elongated trigger or trip bar 11—12, the other terminus extending upwardly adjacent the roof of the box where it is provided with a notch as at 13 for engagement with the free edge of the door 2. This lever or bar is pivoted on the inner face of one side of the box as at 14, it being understood that there is sufficient play in the connection 10 to permit of the slight longitudinal movement necessary of the platform and trip bar.

The door 2 is pivotally mounted upon the rod 15 which extends at both ends through the side walls of the box adjacent the roof thereof, and one terminus of the rod is bent at right angles, extending parallel with the side of the box and forming a handle as at 16, so that the door may be manipulated from the exterior of the box when desired; the object of which will be described later. Centrally, this rod is bent in a somewhat U-shape as at 17, in the loop of which it is fastened as by the short bolt or rivet 18, forming a secure attachment to the door, and the sides of the door are bent upwardly forming flange like portions similar to those upon the trigger platform, and through these flanges of the door the rod 15 extends, forming the door hinge.

A helical spring 20 is attached about the rod 15 on one side of its connection to the door with one end of the spring as at 21 impinging the back of the door and the other free end designed to impinge the inner face of the roof of the box so that when in position the door is at all times forcibly biased towards closed position, thus forming an exceedingly simple and effective door suspension directly connected with the trigger platform.

An additional feature of the invention is that of the handle 16 being accessible from the exterior of the trap so that when desired the door may be opened without putting the hand into the trap, and when thus opened a nail or the like may be inserted within the hole 22 from outside of the trap and beneath the door where it is held open for the convenient removal of the animal without danger of contacting same.

From the foregoing it is evident that I have devised an exceedingly simple and efficient trap of few parts and one exceptionally convenient for setting, as the door may be readily opened either by thrusting the hand against same and inwardly of the trap thus raising the door, or by the handle externally thereof, when the nail or pin may be placed into the hole 22 which will hold the door in open position, and when the bait may be applied to the sprig 8. Then the nail may be removed and by a slight forward pull of the end 12 of the trigger the edge of the door will become lodged in the notch 13 of the trigger; or any time after the trap has been baited a thrust of the hand against the door raising same until the fingers may engage the upstanding end of the trigger and draw same forwardly against the edge of the door the same may be most conveniently set. And, as before stated operation of the door from the exterior of the trap is exceptionally convenient in the removing of an animal alive therefrom.

Another novel feature of the invention is that the trigger operating platform carries the bait so that either the weight of the animal or the pulling of the bait, or both together, operates the trigger through the same instrumentality.

Having thus described my invention, what I claim and desire to secure by Letters Patent, is:

1. A box trap comprising an elongated rectangularly shaped body portion open only at one end, a trigger platform adjacent the closed end, a hinged door adjacent the open end, for closing the same, and a single trip bar one end of which is attached to the platform and the other end engageable with the door, said bar being pivotally attached to one side of the trap intermediate of its ends.

2. A trap of the class described including an elongated box-like structure having a spring actuated door at one end, a screen closure at the opposite end, and a trigger platform adjacent the screen closure characterized by a single L-shaped lever pivotally mounted to the inner face of one side wall of the trap and pivotally attached to the free end of the trigger platform, the opposite end having a notch therein for holding engagement with the door.

3. A trap comprising in combination an enclosure, a spring operated door for confining an animal within the enclosure, a trigger platform, a single trigger connected to the platform and pivotally supported by the trap, and a notch within the trigger for direct engagement with the free edge of the door.

In testimony whereof I affix my signature.

JOHN KLEFFMAN.